Figure 1:
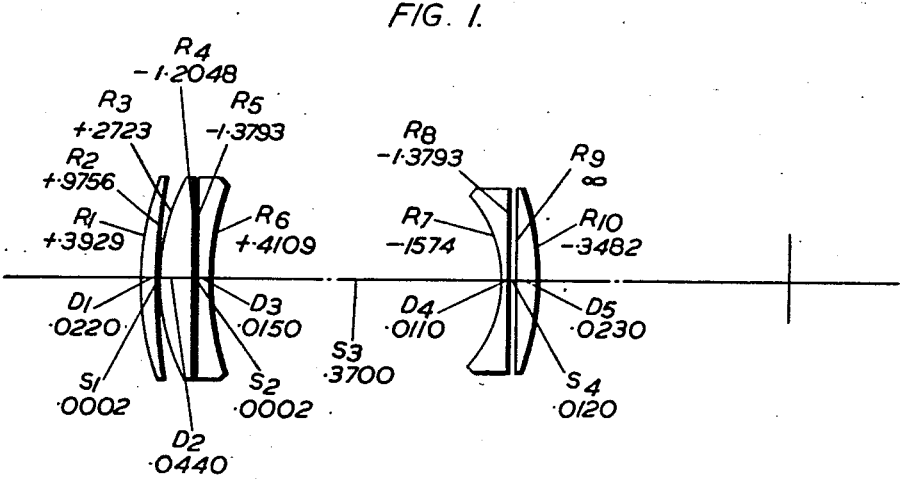

Nov. 24, 1953  G. H. COOK  2,660,095

OPTICAL OBJECTIVE OF THE TELEPHOTO TYPE

Filed June 26, 1952

Inventor

Gordon Henry Cook
By
Emery Holcombe & Blau
Attorney

Patented Nov. 24, 1953

2,660,095

UNITED STATES PATENT OFFICE 2,660,095

OPTICAL OBJECTIVE OF THE TELEPHOTO TYPE

Gordon Henry Cook, Leicester, England, assignor to Taylor, Taylor & Hobson Limited, Leicester, England, a British company Application June 26, 1952, Serial No. 295,601

Claims priority, application Great Britain August 17, 1951

20 Claims. (Cl. 88—57)

This invention relates to an optical objective of the telephoto type, corrected for spherical and chromatic aberrations, coma, astigmatism and field curvature, and comprising a convergent front member widely separated from a divergent rear member.

The present invention has for its object to provide a telephoto objective with a higher degree of correction than has hitherto been obtained, to enable the objective to be made in longer focal lengths to cover wider angular fields at higher apertures.

In the objective according to the invention, the front member consists of three simple components, of which the first is convergent with its surfaces convex to the front, the second is convergent and biconvex, and the third is divergent and biconcave, the curvature of the rear surface of the second component exceeding that of the front surface of the third component by between 0.2 and .2 times the equivalent power of the objective, whilst the radius of curvature of the front surface of the first component is less than .6 F and greater than that of the front surface of the second component, which is in turn greater than .2 F, where F is the equivalent focal length of the objective. This gives better correction especially for chromatic and zonal spherical aberration and for oblique spherical aberration, and the improved oblique corrections permit the rear member to have a diameter much larger than is required for the axial beam alone, thus avoiding the vignetting that has hitherto been objectionable.

The axial air separation between the second and third components of the front member is preferably less than .01 F, and that between the front and rear members preferably lies between .32 F and .42 F. The equivalent focal length of the front member conveniently lies between .6 F and .8 F. The mean refractive index of the material of the third component of the front member preferably exceeds that of the second component thereof by at least .05. The radius of curvature of the rear surface of the third component of the front member may lie between .3 F and .7 F.

In order to reduce distortion, from which known telephoto objectives usually suffer badly, the divergent rear member of the objective preferably comprises two simple components separated by an air space having greater marginal thickness than axial thickness. Conveniently, the first of these components is divergent with its surfaces concave to the front, the second being convergent with its rear surface concave to the front. The radius of curvature of the front surface of the second component of the rear member is preferably greater than 3 F, that of the rear surface of the first component of the rear member lying between .7 F and 3 F. Conveniently, the radius of curvature of the front surface of the first component of the rear member lies between .125 F and .2 F, whilst that of the rear surface of the second component of the rear member lies between .25 F and .5 F. The mean refractive index of the material of the second component of the rear member is preferably at least .05 greater than that of the first component thereof.

Figure 2:
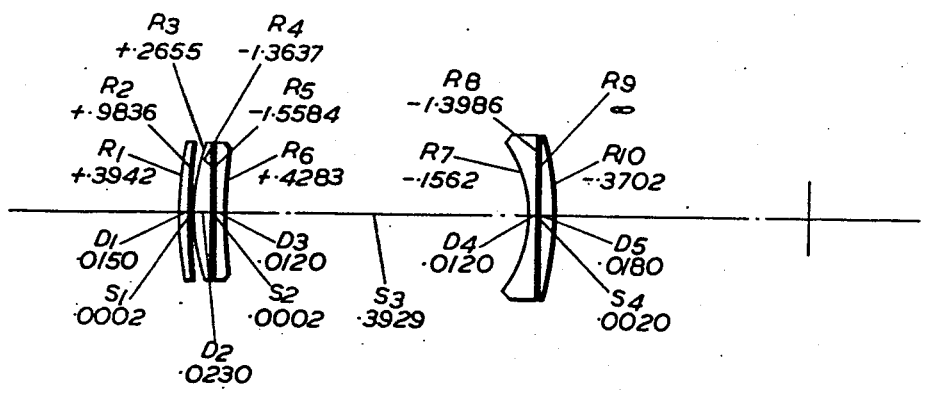

Figures 1 and 2 of the accompanying drawings respectively illustrate two convenient practical examples of objective according to the invention.

Numerical data for these two examples are given respectively in the following tables, in which $R_1$ $R_2$ ... represent the radii of curvature of the surfaces of the objective counting from the front, the positive sign indicating that the surface is convex to the front and the negative sign that it is concave thereto, $D_1$ $D_2$ ... represent the axial thicknesses of the individual elements, and $S_1$ $S_2$ ... represent the axial air separations between the components. The tables also give the mean refractive index $n_D$ for the D-line and the Abbé V number of each of the materials used for the elements.

*Example I*

| Equivalent focal length 1.000. Relative Aperture F/1.0 | | | |
|---|---|---|---|
| Radius | Thickness or Air Separation | Refractive Index $n_D$ | Abbé V Number |
| $R_1$=+ .3920 | $D_1$=.0220 | 1.5722 | 57.7 |
| $R_2$=+ .9756 | $S_1$=.0002 | | |
| $R_3$=+ .2723 | $D_2$=.0140 | 1.5743 | 52.0 |
| $R_4$=−1.2048 | $S_2$=.0002 | | |
| $R_5$=−1.3793 | $D_3$=.0150 | 1.7004 | 30.3 |
| $R_6$=+ .4109 | $S_3$=.3700 | | |
| $R_7$=− .1574 | $D_4$=.0110 | 1.5743 | 52.0 |
| $R_8$=−1.3793 | $S_4$=.0120 | | |
| $R_9$=∞ | $D_5$=.0230 | 1.7004 | 30.3 |
| $R_{10}$=− .3482 | | | |

| Equivalent focal length 1.000. Relative Aperture F/6.3 |||| 
|---|---|---|---|
| Radius | Thickness or Air Separation | Refractive Index $n_D$ | Abbé V Number |
| $R_1 = +.3912$ | $D_1 = .0150$ | 1.5722 | 57.7 |
| $R_2 = +.9836$ | $S_1 = .0002$ | | |
| $R_3 = +.2655$ | $D_2 = .0230$ | 1.5743 | 52.0 |
| $R_4 = -1.3637$ | $S_2 = .0002$ | | |
| $R_5 = -1.5584$ | $D_3 = .0120$ | 1.7004 | 30.3 |
| $R_6 = +.4283$ | $S_3 = .3929$ | | |
| $R_7 = -.1562$ | $D_4 = .0120$ | 1.5743 | 52.0 |
| $R_8 = -1.3986$ | $S_4 = .0020$ | | |
| $R_9 = \infty$ | $D_5 = .0180$ | 1.7004 | 30.3 |
| $R_{10} = -.3702$ | | | |

The back focal length from the rear surface $R_{10}$ to the back focal plane is .3296 F in Example I and .3321 F in Example II, so that the overall length of the objective from the front surface $R_1$ to the back focal plane (indicated at B) is .8270 F in Example I and .8074 F in Example II.

The semi-angular field covered is ±10° in both examples. In Example I the diameter of the front surface $R_1$ is .25 F and that of the rear surface $R_{10}$ is .22 F. Example II on the other hand has its rear member of greater diameter than the front member, and is substantially free from any vignetting troubles. Thus, the diameters in Example II are .16 F at $R_1$ and .19 F at $R_{10}$.

In Example I the curvatures of the surfaces $R_4$ and $R_5$ are respectively approximately .830/F and .725/F, the difference being .105/F. The corresponding figures for Example II are .733 at $R_4$ and .642/F at $R_5$, the difference being .091/F.

The equivalent focal length of the front member is .696 F in Example I and .676 F in Example II.

What I claim as my invention and desire to secure by Letters Patent is:

1. An optical objective of the telephoto type corrected for spherical and chromatic aberrations, coma, astigmatism and field curvature, and comprising a divergent rear member, and a convergent front member widely separated therefrom, the front member consisting of three simple components of which the first is convergent with its surfaces convex to the front, the second is convergent and biconvex and the third is divergent and biconcave, the curvature of the rear surface of the second component exceeding that of the front surface of the third component by between .02 and .2 times the equvalent power of the objective, whilst the radius of curvature of the front surface of the first component is less than .6 F and greater than that of the front surface of the second component which in turn is greater than .2 F, where F is the equivalent focal length of the objective.

2. An optical objective as claimed in claim 1, in which the axial air separation between the second and third components of the front member lies between zero and .01 F.

3. An optical objective as claimed in claim 2, in which the axial air separation between the front and rear members lies between .32 F and .42 F.

4. An optical objective as claimed in claim 3, in which the equivalent focal length of the front member lies between .6 F and .8 F.

5. An optical objective as claimed in claim 4, in which the radius of curvature of the rear surface of the third component of the front member lies between .3 F and .7 F, the material of such third component having mean refractive index at least .05 greater than that of the second component of the front member.

6. An optical objective as claimed in claim 1, in which the axial air separation between the front and rear members lies between .32 F and .42 F.

7. An optical objective as claimed in claim 1, in which the equivalent focal length of the front member lies between .6 F and .8 F.

8. An optical objective as claimed in claim 1, in which the rear surface of the third component of the front member has radius of curvature between .3 F and .7 F.

9. An optical objective of the telephoto type corrected for spherical and chromatic aberrations, coma, astigmatism and field curvature, and comprising a divergent rear member, consisting of two simple components separated by an air space having greater marginal thickness than axial thickness, and a convergent front member widely separated therefrom, the front member consisting of three simple components of which the first is convergent with its surfaces convex to the front, the second is convergent and biconvex and the third is divergent and biconcave, the curvature of the rear surface of the second component exceeding that of the front surface of the third component by between .02 and .2 times the equivalent power of the objective, whilst the radius of curvature of the front surface of the first component is less than .6 F and greater than that of the front surface of the second component which in turn is greater than .2 F, where F is the equivalent focal length of the objective.

10. An optical objective as claimed in claim 9, in which the first of the two components of the rear member is divergent with its surfaces concave to the front and the second is convergent with its rear surface concave to the front, the mean refractive index of the material of such second component being at least .05 greater than that of the first component.

11. An optical objective as claimed in claim 10, in which the axial air separation between the front and rear members lies between .32 F and .42 F.

12. An optical objective as claimed in claim 11, in which the equivalent focal length of the front member lies between .6 F and .8 F.

13. An optical objective as claimed in claim 12, in which the axial air separation between the second and third components of the front member lies between zero and .01 F, the mean refractive index of the material of such third component being at least .05 greater than that of the second component, the rear surface of the third component having radius of curvature between .3 F and .7 F.

14. An optical objective as claimed in claim 10, in which the axial air separation between the second and third components of the front member lies between zero and .01 F.

15. An optical objective of the telephoto type corrected for spherical and chromatic aberrations, coma, astigmatism and field curvature, and comprising a divergent rear member, consisting of two simple components separated by an air space having greater marginal thickness than axial thickness, the first of such components being divergent with its surfaces concave to the front and the second convergent with its rear surface concave to the front, and a convergent front member widely separated therefrom, the front member consisting of three simple components of which the first is convergent with its surfaces convex to the front, the second is convergent and biconvex and the third is divergent and biconcave, the curvature of the rear surface of the second component exceeding that of the front surface of the third component by between .02 and .2 times the equivalent power of the objective, whilst the radius of curvature of the front surface of the first component is less than .6 F and greater than that of the front surface of the second component which in turn is greater than .2 F, where F is the equivalent focal length of the objective.

16. An optical objective as claimed in claim 15, in which the radius of curvature of the front surface of the second component of the rear member lies between 3 F and plano and that of the rear surface of the first component of the rear member lies between .7 F and 3 F.

17. An optical objective as claimed in claim 16, in which the radius of curvature of the front surface of the first component of the rear member lies between .125 F and .2 F and that of the rear surface of the second component of the rear member lies between .25 F and .5 F.

18. An optical objective as claimed in claim 17, in which the axial air separation between the front and rear members lies between .32 F and .42 F and that between the second and third components of the front member lies between zero and .01 F.

19. An optical objective as claimed in claim 15, in which the radius of curvature of the front surface of the first component of the rear member lies between .125 F and .2 F and that of the rear surface of the second component of the rear member lies between .25 F and .5 F.

20. An optical objective as claimed in claim 15, in which the equivalent focal length of the front member lies between .6 F and .8 F.

GORDON HENRY COOK.

References Cited in the file of this patent

UNITED STATES PATENTS

| Number | Name | Date |
|---|---|---|
| 2,321,973 | Bennett | June 15, 1943 |
| 2,378,170 | Aklin | June 12, 1945 |
| 2,458,836 | Cox | Jan. 11, 1949 |
| 2,576,436 | Baker | Nov. 27, 1951 |

FOREIGN PATENTS

| Number | Country | Date |
|---|---|---|
| 388,215 | Great Britain | Feb. 23, 1933 |